US012547425B2

(12) United States Patent
Ogilvie et al.

(10) Patent No.: US 12,547,425 B2
(45) Date of Patent: Feb. 10, 2026

(54) LIBRARY IDENTIFICATION IN APPLICATION BINARIES

(71) Applicant: Zimperium, Inc., Dallas, TX (US)

(72) Inventors: Duncan Ogilvie, Wrocław (PL); Matteo Favaro, Noale (IT); Nicolás Chiaraviglio, Barcelona (ES); Jose Fernandez Portal, Córdoba (AR)

(73) Assignee: Zimperium, Inc., Dallas, TX (US)

( * ) Notice: Subject to any disclaimer, the term of this patent is extended or adjusted under 35 U.S.C. 154(b) by 116 days.

(21) Appl. No.: 18/651,129

(22) Filed: Apr. 30, 2024

(65) Prior Publication Data

US 2025/0335212 A1    Oct. 30, 2025

(51) Int. Cl.
*G06F 9/445* (2018.01)
*G06F 21/57* (2013.01)

(52) U.S. Cl.
CPC ........ *G06F 9/44521* (2013.01); *G06F 21/577* (2013.01); *G06F 2221/033* (2013.01)

(58) Field of Classification Search
CPC ............... G06F 9/44521; G06F 21/577; G06F 2221/033; G06F 9/445; G06F 21/57
See application file for complete search history.

(56) References Cited

U.S. PATENT DOCUMENTS

| 2017/0068816 | A1* | 3/2017 | Cavazos | G06N 3/084 |
| 2020/0380125 | A1* | 12/2020 | Hayrynen | G06F 8/47 |
| 2022/0335243 | A1* | 10/2022 | Yin | G06F 16/7867 |

FOREIGN PATENT DOCUMENTS

KR   20170096440 A  *  8/2017  ........... G06F 21/563

OTHER PUBLICATIONS

Go et al. KR 20170096440 (hereinafter "Go") (machine translation) (Year: 2017).*

* cited by examiner

*Primary Examiner* — Robert B Leung
*Assistant Examiner* — Howard H. Louie
(74) *Attorney, Agent, or Firm* — Fenwick & West LLP

(57) ABSTRACT

A system and a method are disclosed for identifying libraries used by an application based on the program code of the application. The system accesses a plurality of program codes of the application. For at least one program code, the system extracts raw type data from the program code and normalizes the raw type data to generate target normalized type data. The target normalized type data includes data type information of the program code. The system determines a set of candidate library types corresponding to the program code. The system accesses candidate raw type data associated with each candidate library type and determines a library type corresponding to the program code by comparing the program code of the application with the program code of each of the set of the candidate library types.

20 Claims, 7 Drawing Sheets

```
Class NamedPoint:
  int x
  int y
  Java/lang/String name
```
310

312 — Simplified:  class  ( int   int    java/lang/String )

314 — With depth:  class_0  ( int_1   int_1  java/lang/String_1 )

```
Class Point:
  int x
  int y

Class Rectangle:
  boolean filled
  Point topLeft
  Point bottomRight
```
320

322 — Normalized:  class_0  ( boolean_1   class_1   ( int_2   int_2 )   class_1   ( int_2   int_2 ) )

324 — Deduplicated:  class_0:0 (boolean_1:0  class_1:0  (int_2:0 int_2:1)  class_1:1  (int_2:2 int_2:3) )

*FIG. 3*

LIBRARY IDENTIFICATION IN APPLICATION BINARIES

TECHNICAL FIELD

The disclosure generally relates to the field of computing technology, and more particularly relates to identifying libraries in application binaries by leveraging type information.

BACKGROUND

The software bill of materials (SBOM) is a concept and practice within the field of software development and cybersecurity. It refers to a list of components that make up software applications. The SBOM may include various libraries, frameworks, modules, and dependencies that are utilized in building a software application. A potential solution to identify the libraries used by a software application without the source code is to collect a huge corpus of compiled libraries and search the application binary for functions or code sequences it has in common with these libraries. However, determining the similarity of binary code is a complex problem. For example, a deep comparison which often includes comparing two functions, is costly, and the expense becomes prohibitive when comparing all the functions used by a piece of software application with potentially billions of functions from the corpus of collected libraries. Additionally, the code in an application is often optimized, which further increases the complexity and cost to determine how similar the code in an application binary is compared to the library code.

SUMMARY

Systems and methods are disclosed herein for identifying libraries used by an application based on the application binary code. The program code of an application often is referred to as application executables, which are files that contain the compiled code of a software application, allowing it to be run on a computer system. The application executables may include raw type data which includes information about the data types in the program code. A data type specifies the type of value a variable may hold. In some embodiments, the data type may define the operations that may be done on the data, the meaning of the data, and/or the way values of that type may be stored. The system accesses a plurality of program codes of the application. For at least one program code, the system extracts raw type data from the program code and normalizes the raw type data to generate target normalized type data. The normalized type data includes data type information of the program code.

The system uses the normalized type data to determine a set of candidate library executables that may be contained in the program code. A library executable refers to a collection of functions/types/data that may be used in different applications, e.g., a set of program codes or applications that are designed to perform specific tasks. In some embodiments, the system may determine a set of candidate library types that correspond to the program code of the target application. In one implementation, the system may encode the target normalized type data of the program code as a target indexed data type. The system may access a database that includes a plurality of indexed library data types, and each indexed library data type corresponds to a data type of a library type. The system determines a measure of similarity between the target indexed data type of the program code and at least one indexed library data type from the database. Based on the determined measure of similarity, the system determines the set of candidate library types having the corresponding indexed library data type. The system accesses a program code associated with each of the set of candidate library types and determines a library type corresponding to the program code of the target application based on a comparison between the program code of the target application and the program code of each of the set of the candidate library types. Based on the determined library type, the system may further determine the library and/or version number of the determined library type. In some embodiments, the system may output a list of libraries and their version numbers, such as, software development kits (SDK)/framework included in the target application.

In some embodiments, the model is trained on a plurality of different normalized type data, for example, a mixture of real types extracted from actual libraries, random derivations of those and/or completely generated normalized types. The model may be trained to learn the structure of normalized types of applications and can be used as a function that indexes the normalized type data to generate an indexed data type, e.g., converting a normalized type data into a "vector."

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 illustrates exemplary raw type data and normalized type data, according to one or more embodiments.

DETAILED DESCRIPTION

Figure 1:
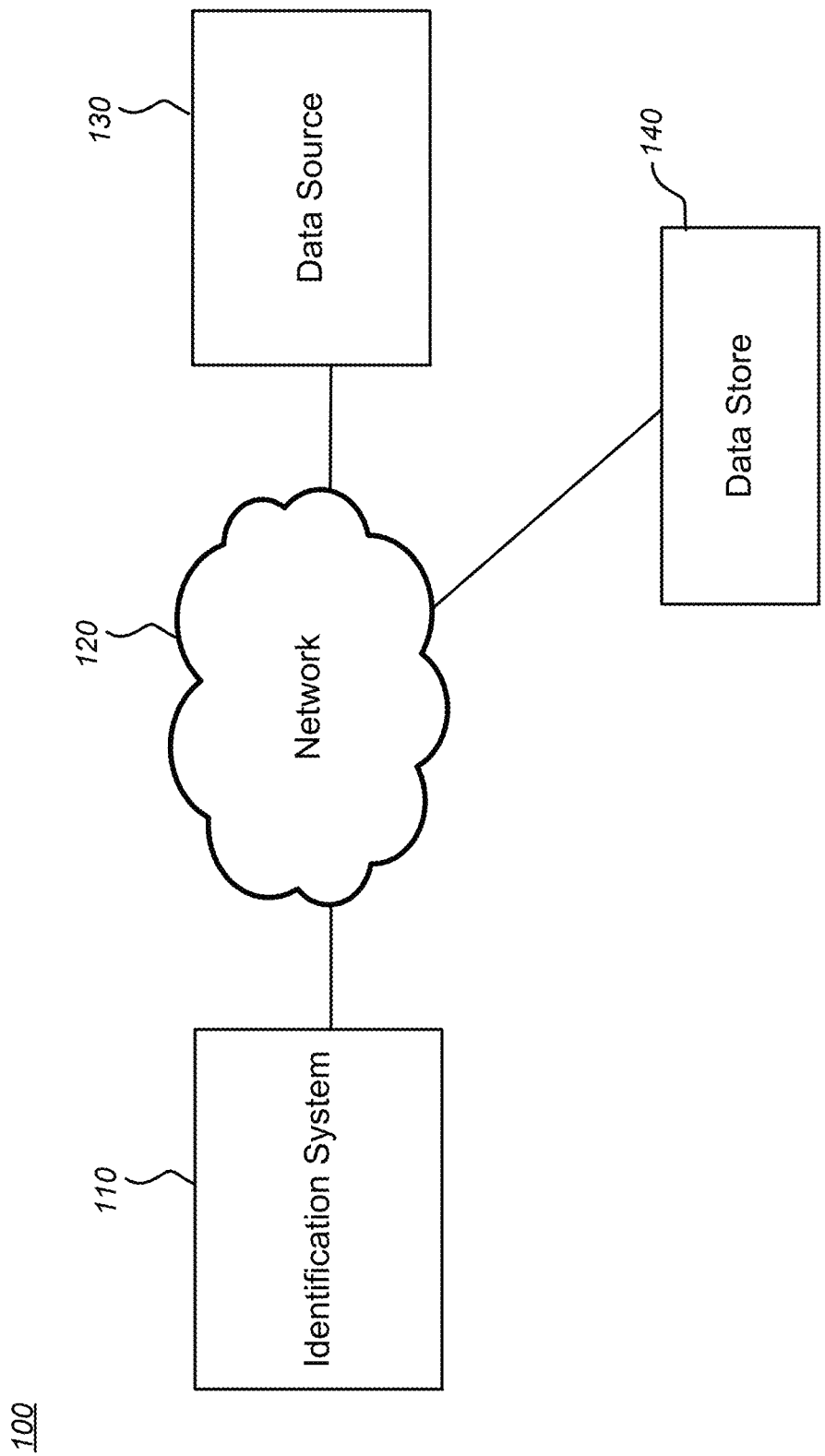
FIG. 1 illustrates one embodiment of a system environment including a computing device with an identification system, according to one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Identifying an application type in application binaries without accessing the source code is difficult due to the complexity of the binary code. Deep comparison of binary code requires understanding the semantic meaning of the program codes, which can be a challenging task. Extracting meaningful features from code, handling variations in coding styles, and capturing the intent behind code snippets all contribute to the complexity of binary code analysis. Additionally, the application code is often optimized, which drastically changes the shape of the code (e.g., inlining, dead code removal, parameter specialization). Consequently, comparing binary similarity becomes less effective or accurate. Deep comparison approaches may also have issues in generalizing across different programming languages, coding styles, or development paradigms. Adapting models or algorithms to diverse codebases may require extensive training or customization. The solution provided herein is to utilize the data types included in an application, because data types are fundamental for understanding behaviors of the codes and less likely to be changed by code optimizations. Starting from comparing the data type rather than a deep comparison of two binary codes simplifies the process of identifying application type in an application.

One embodiment of a disclosed system, method and computer readable storage medium includes an identification system that identifies libraries used by a target application based on the target application's program code. The system may collect a database of compiled library types and search application program code for functions or code sequences that are in common with these library types. The system may extract raw type data from a program code and generate normalized type data. Using the normalized type data, the system may pre-filter the library types to select top matched library types and apply a heavy match to the top matches to determine a library type corresponding to the program code of the target application. In this way, the identification system identifies the library types used by a target software application (e.g. program code/executable) without accessing the source code.

In one embodiment, the system accesses a plurality of program codes in the target application's binary code. For at least one program code, the system extracts raw type data from the program code and normalizes the raw type data to generate target normalized type data. The target normalized type data includes data type information of the program code. The system applies a model to the target normalized type data to index the target normalized type data as an indexed data type and determine a set of candidate library types corresponding to the program code. The system accesses program codes associated with each candidate library type and determines a library type corresponding to the type of the target application by comparing the program code of the target application with the program codes of each of the set of the candidate library types.

System Overview

FIG. 1 illustrates one embodiment of a system environment 100 including an identification system 110, according to one or more embodiments. Environment 100 also includes network 120, a data source 130, and a data store 140. The system environment 100 may also include different or additional entities.

The identification system 110 is a computer system configured to identify the application type of an application. The identification system 110 may include a singular computing system, such as a single computer, or a network of computing systems, such as a data center or a distributed computing system. The identification system 110 may be one or more servers (e.g., forming a cloud-based service) that receives data and performs analysis to determine an application type of an application. In some implementations, as the identification system 110 accesses a plurality of program codes related to the binary code of software application from a data source 130 via the network 120, the identification system 110 may identify one or more application types corresponding to the plurality of program codes. The identification system 110 performs this task by applying normalization to raw type data of the program codes, and before computing a full similarity between the program codes and the library types, the identification system 110 applies deep learning models to identify a set of candidate library types.

The identification system 110 may access the data source 130 and data store 140 through the network 120. In some embodiments, the network 120 includes any combination of local area and/or wide area networks, using wired and/or wireless communication systems. The network 120 may use standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 120 may be encrypted using any suitable technique or techniques.

The data source 130 stores software applications. The data source 130 may be an app store, a website, a physical media (e.g., hard drive, disks, etc.), and the like. The identification system 110 may access the data source 130 to discover, download and install software applications. Alternatively, the data source 130 may be a cloud-based platform where the identification system 110 may access and use software applications over the network 120 without having to install the applications locally. In some embodiments, the data source 130 may be a data source that includes information corresponding to the software applications, such as, program codes, metadata, raw type data, etc.

The data store 140 may include a non-transitory computer-readable storage medium that stores identified library types and various data related to applications such as binary code. In some embodiments, the data store 140 may include a library database that stores the program codes (executables of various known applications). In some embodiments, the data store 140 may include a type similarity database (e.g., a vector database). A type similarity database may be a knowledge base that includes a library of indexed type data corresponding to various application types. In some embodiments, the data store 140 may store a plurality of models. In some implementations, the models may include a machine learning model. In some implementations, the models may include models that encode normalized type data to an indexed data type (e.g., a vector) in a latent space. In some implementations, the models may include models that determine a measure of similarity between a target normalized type data and a library type data. The data store 140 may be integrated as a part of the identification system 110. Alternatively, the data store 140 may be located differently from the identification system 110. Further details about identification system 110 are described below with reference to FIGS. 2-7.

Identification System Configuration

Figure 2:
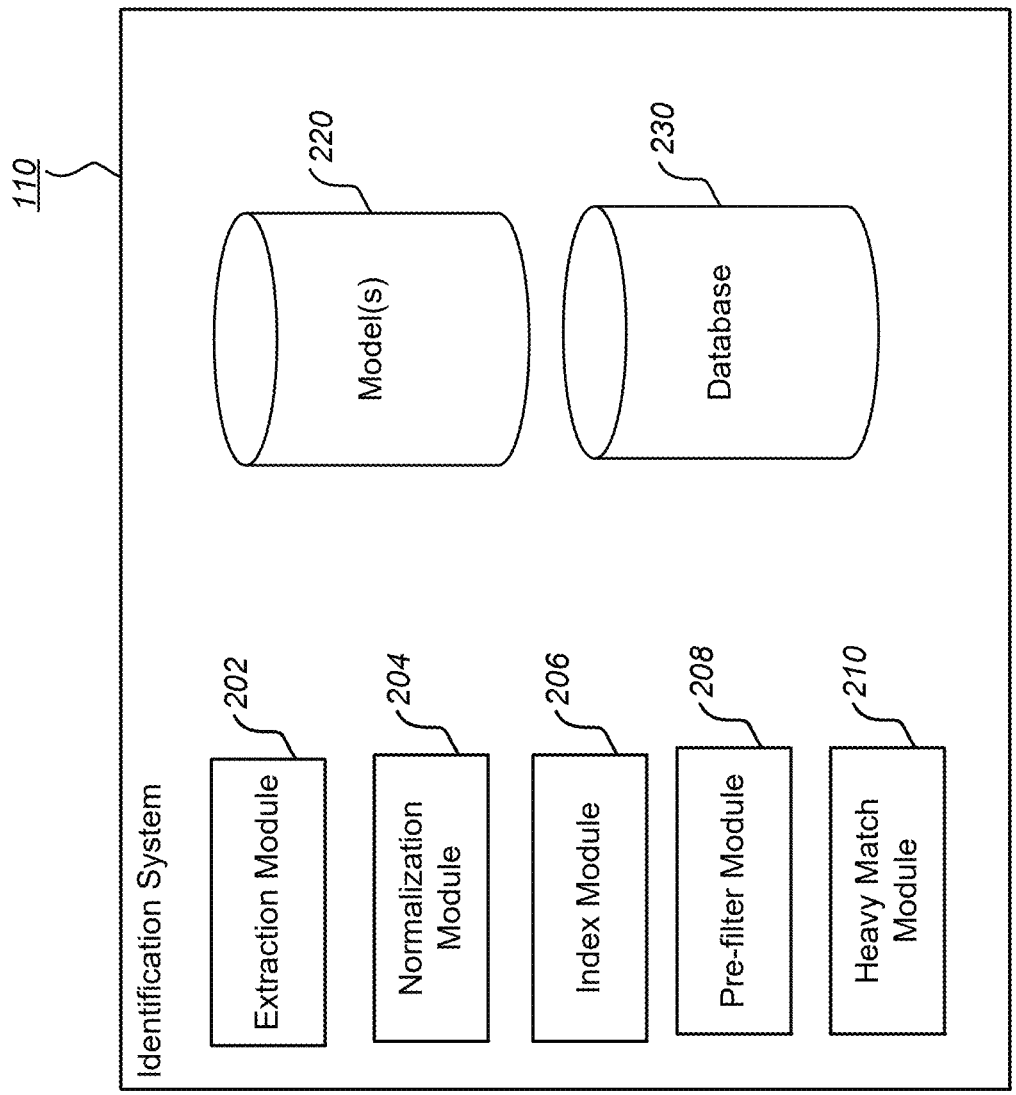
FIG. 2 illustrates one embodiment of exemplary modules of an identification system, according to one or more embodiments.

FIG. 2 illustrates one embodiment of exemplary modules of an identification system, according to one or more embodiments. The identification system 110 includes an extraction module 202, a normalization module 204, an index module 206, a pre-filter module 208, a heavy match module 210, models 220, and a database 230. The modules depicted with respect to identification system 110 are exemplary; more or fewer modules, and databases may be used, consistent with the disclosure provided herein.

The extraction module 202 accesses a plurality of program codes included in an application's program codes and extracts raw type data from at least one program code for the application. A program code of the application may include raw type data which includes information of data type of the program code. A data type specifies the type of value a variable may hold. In some embodiments, the data type may define the operations that may be done on the data, the meaning of the data, and/or the way values of that type may be stored. Examples of data types include integers, floating-point numbers, characters, strings, and more complex types like arrays and structures. The extraction module 202 extracts raw type data from the program code. The extracted raw type data may be JSON data, including information such as, class, field, depth, method, string, basics blocks, cross-references, etc. In some implementations, the program codes of an application may include native code that is executed by a CPU and not contain information about the data types. The extraction module 202 may perform a reconstruction algorithm and analyze the native code to obtain the data type information of the application. The extracted raw type data may be stored in a library database (e.g., the database 230). In some implementations, the extracted raw type data may be stored temporarily and not added to the library database.

The normalization module 204 retrieves the extracted raw type data and normalizes the raw type data to generate target normalized type data of the program code. The target normalized type data includes the data type information of the program code. In some embodiments, the normalization module 204 may normalize the raw type data into a flat string that describes at least class information and depth information of the raw type data. By changing the format of the raw type data, e.g., from a graph to a string, more diversified analysis may be applied to the normalized type data. In some implementations, Java classes may be recursively described as a collection of primitive types (and system classes defined in the Java/Android core libraries). The normalized type data with a flat string structure is suitable for fast processing using machine learning models, for example, by either indexing library types, or pre-filtering application types.

FIG. 3 illustrates exemplary raw type data and normalized type data, according to one or more embodiments. As shown in FIG. 3, an exemplary raw type data 310 includes a class, two integer fields, and a string field. The "class Named-Point" describes a new type that has 3 fields with the names "x", "y" and "name." The fields "x" and "y" have the type "int" and the field "name" has the type "string." The raw type data 310 is in a format of graph, e.g., a data structure in a graph with the connections. In some embodiments, the normalized type data may include "depth" information, which refers to the number of steps from the root of the graph to get to a specific field. The normalization module 204 may use the representation of this raw type data 310, e.g., the format, the parameters, categories, etc., included in the raw type data 310 to obtain a normalized type data. In one example, the normalization module 204 may keep the order of the fields in the string, but not the specific values, to generate a simplified normalized type data 312. In another example, specific string values used by the code are included to generate the normalized type data. In some implementations, the normalization module 204 may keep some information about the hierarchy of the raw type data 310. For example, the normalization module 204 may add depth information to the normalized type data. As shown in FIG. 3, the normalized type data 314 with depth information includes an underscore "0" for the class, and an underscore "1" for each of the fields. In this way, the normalization module 204 normalizes raw type data in normalized type data in a flat string, with the class, field, and depth information in a line structure.

In some embodiments, for raw type data having data structure hierarchies, generating a normalized type data with the class, field and depth information may result in duplicated information in the normalized type data. For example, in FIG. 3, the raw type data 320 includes 2 classes, each class having one or more fields. One of the classes is a rectangle class which includes a boolean field; and the other class is a point class. The corresponding normalized type data 322 may include duplicated information and the hierarchical information included in the raw type data may be lost. As shown in FIG. 3, both classes and the integer fields are represented in the same way, i.e., the string segment, "class_1 (int_2 int_2)" is represented twice, while the class to which the boolean field belongs is not indicated. In this case, the normalization module 204 may deduplicate the normalized type data to keep the hierarchy and structure information of the raw type data (e.g., normalized type data 324). In some implementations, the normalization module 204 may keep the order/hierarchy of the classes/fields in the stings. For example, the normalization module 204 may account for the number of classes in the string and add a counter to the repeated segment string, e.g., "class_1:0" and "class_1:1" in the normalized type data 324. Similar deduplication operation may be applied to the boolean field, integer field, and other classes or fields. In some embodiments the normalization module 204 may apply deduplication operations when generating the normalized type data to keep various structural/hierarchical information in the raw type data.

Referring back to FIG. 2, the index module 206 may index the normalized type data to obtain an indexed data type. In some embodiments, the index module 206 may apply a machine learning model to the normalized type data to generate an indexed data type (e.g., a vector) and store the indexed data type in a type similarity database (e.g., database 230). In some embodiments, the index module 206 may include a trained encoder that encodes (e.g., by using the machine learning model) the normalized type data into an indexed data type. In some implementations, the machine learning model may be an unsupervised learning model. For example, during training, input data (e.g., normalized type data) may be fed into the encoder and the encoder processes the input data to generate an encoded representation (e.g., a vector in a latent space). In one implementation, a decoder may be used to reconstruct the normalized type data based on the indexed data type and a loss may be computed by comparing the reconstructed normalized type data and the original normalized type data. By minimizing the loss, the machine learning model may be iteratively trained. Once the training is complete, the encoder may be used to generate indexed data types for new input data.

In some embodiments, the encoder is configured to cluster the indexed data types in the latent space. The distance of two vectors in the latent space may indicate the similarity of the corresponding normalized type data. For example, the encoder may apply the machine learning model to two pieces of normalized type data that have similar features (e.g., application type), the indexed data types corresponding to the two pieces of normalized type data are also clustered in the latent space, e.g., close in distance in the latent space.

The indexing method disclosed herein encompasses a variety of techniques beyond those explicitly mentioned; it will be appreciated that the disclosure is not limited to the above discussed embodiment. In one implementation, the index module 206 may index the normalized type data into a vector in a latent space. In some embodiments, the index module 206 may apply various techniques for indexing the normalized type data to indexed data type. For example, Locality-Sensitive Hashing (LSH) hashes similar data points into the same or nearby buckets, enabling approximate nearest neighbor search. Product quantization compresses vectors into subvectors and quantizes them independently, reducing memory usage and accelerating similarity computation. Tree-based indexing structures like KD-trees partition the data space hierarchically for efficient range and nearest neighbor queries.

In some embodiments, the index module 206 may access a plurality of data sources. In some embodiments, the data sources may be external data sources, such as Java repositories and the like. The data source may include data type information of executables (e.g., program codes) of a plurality of known applications, which may be referred to as library executables. The index module 206 may use the encoder to apply the trained model to the normalized type data that corresponds to the data type information of the library executables in the data sources. The index module 206 may encode a large amount of data type information corresponding to various application types into corresponding indexed data types. The index module 206 may store the indexed data types to create a knowledge base, such as a type similarity database in the database 230. The indexed data types of the known applications stored in the type similarity database may be referred to as indexed library data types. Each indexed library data type may correspond to the normalized type data of a library executable (e.g., a program code of a known application type).

In one implementation, the index module 206 may index the library types based on distances between the corresponding normalized type data in the latent space, and store the indexed library data types in the type similarity database. In this way, the indexed library data types in the type similarity database may be used to compare and identify the application type of an unknown indexed data type. In some embodiments, the index module 206 may perform the indexing process/encoding process offline. In some embodiments, the index module 206 may periodically access new input data from the data sources and constantly update the type similarity database based on the new input data.

The pre-filter module 208 determines a set of candidate library types corresponding to a program code of a target application. In some embodiments, the pre-filter module 208 may query the type similarity database for a list of library types that are most similar to the program code of a target application. In some embodiments, the pre-filter module 208 may output a set of candidate indexed library data types for each target data type. Based on the determined candidate indexed library data types, the pre-filter module 208 may determine a set of candidate library types that corresponds to the set of candidate indexed library data types for the target data type. In some embodiments, the pre-filter module 208 may determine a set of candidate library types for each program code included in the program code of the target application.

The pre-filter module 208 may apply various methods for determining the similarity of two indexed data types. In some implementations, the pre-filter module 208 may use nearest neighbor search algorithms like k-nearest neighbors or approximate nearest neighbor search to determine similarity between the indexed data types. In some implementations, graph-based techniques rely on graph traversal algorithms to determine similarity based on relationships between the indexed data types. In some embodiments, the pre-filter module 208 may use machine learning models, including similarity learning algorithms or Siamese neural networks, to predict similarity.

In some embodiments, the normalized type data may be represented by a multidimensional vector. Each dimension of the vector may represent a different aspect or feature of the normalized type data, such as structure, hierarchy, etc. When using a vector representation for comparison, the multidimensionality may provide a more detailed and nuanced analysis. For example, distance metrics, such as Euclidean distance or cosine similarity, may be applied to measure the similarity or dissimilarity between vectors. These metrics provide a quantitative measure of how close or far apart two data points are in the vector space.

In some implementations, the pre-filter module 208 may access a vector database (e.g., type similarity database) which includes a plurality of library vectors (e.g., indexed library data types). Each library vector may correspond to normalized type data of a library type. The pre-filter module 208 may compare the target normalized type data to the library vectors and determine a measure of similarity between the indexed target data type of the program code and one or more library vectors. In some embodiments, the measure of similarity between the indexed target data type and a library vector is a distance between the target indexed data type and the library vector in the latent space. In one example, the pre-filter module 208 may identify a library vector within a threshold distance of the target indexed data type in the latent space. The pre-filter module 208 may identify the one or more library vectors using one or more nearest neighbor methods or approximate nearest neighbor methods. In some embodiments, the pre-filter module 208 may rank the library vectors based on the measure of similarities and identify a top N library vectors (e.g., top-N matching indexed library data types) in the rank as the candidate library vectors for the target indexed data type.

In other embodiments, the pre-filter module 208 determines a measure of similarity between the target indexed data type and a library vector (e.g., indexed library data type) as a dot product or a cosine similarity between the target normalized type data and a library vector. In some embodiments, the pre-filter module 208 uses K-means clustering to generate clusters of the library vectors based on the target vector.

The pre-filter module 208 may eliminate irrelevant or obviously mismatched normalized type data, reducing the overall number of comparisons needed, which improves the efficiency of the matching process, especially when dealing with large datasets. The pre-filter module 208 reduces the computational burden by narrowing down the set of candidate library types for the heavy match, focusing computational resources on the most promising matches. Heavy matching, especially when involving complex algorithms or similarity measures, can be computationally expensive. Without pre-filtering, the heavy matching step may become impractical or time-consuming for very large datasets. After the pre-filter module 208 determines the set of candidate library types, the candidate library types and the program code of the target application may be transmitted to the heavy match module 210 for deep comparison.

The heavy match module 210 accesses program code (e.g., executable) associated with each of the set of candidate library types and determines a library type corresponding to the program code of the target application by comparing program codes of the target application with the program codes of each of the set of the candidate library types. In some embodiments, the heavy match module 210 may access the program codes for each of the candidate library types from a library database (e.g., stored in the database 230). In some implementations, the comparison may include processing the program codes of the candidate library types to generate a list of libraries and the corresponding version numbers. Based on the comparison, the heavy match module 210 may determine at least one library type corresponding to the program code of the target application. Based on the determined library type, the heavy match module 210 may further determine the library and/or version number of the determined library type. In some embodiments, the heavy match module 210 may output a level/percentage of matching, e.g., candidate library X with version Y matches Z % of the target application. In some embodiments, the heavy match module 210 may output a list of libraries and their version numbers.

The models 220 may include a plurality of models. In some embodiments, the models may include a machine learning model. In some implementations, the machine learning model may be an unsupervised learning model. In some embodiments, the models may include one or more models that index module 206 uses to encode the normalized type data to an indexed data type. In some embodiments, the models may include one or more models that the pre-filter module 208 uses to determine the measure of similarity between a target indexed data type and an indexed library data type.

The database 230 may be configured to store data. In some embodiments, the database 230 may include a data source that stores raw data or program code of each of a plurality of applications. In some embodiments, the database 230 may include a library database 420 configured to store raw type data associated with program codes of applications. For example, the library database 420 may store the library files (e.g., library executables, program codes, etc. of known applications). The library database 420 may also store the associations between the normalized library type data and the corresponding library files, and/or the indexed library data types and the corresponding library files. For example, the library database 420 may include a look-up table for mapping between the indexed data types and the corresponding program codes/executables. In some embodiments, the database 230 includes a type similarity database 430 which stores indexed normalized type data (e.g., indexed data type). In some implementations, the vector database 430 may include a vector database that is configured to store vectors in a latent space, and a vector may correspond to the normalized type data of a program code of an application.

Indexing Data Type

Figure 4:
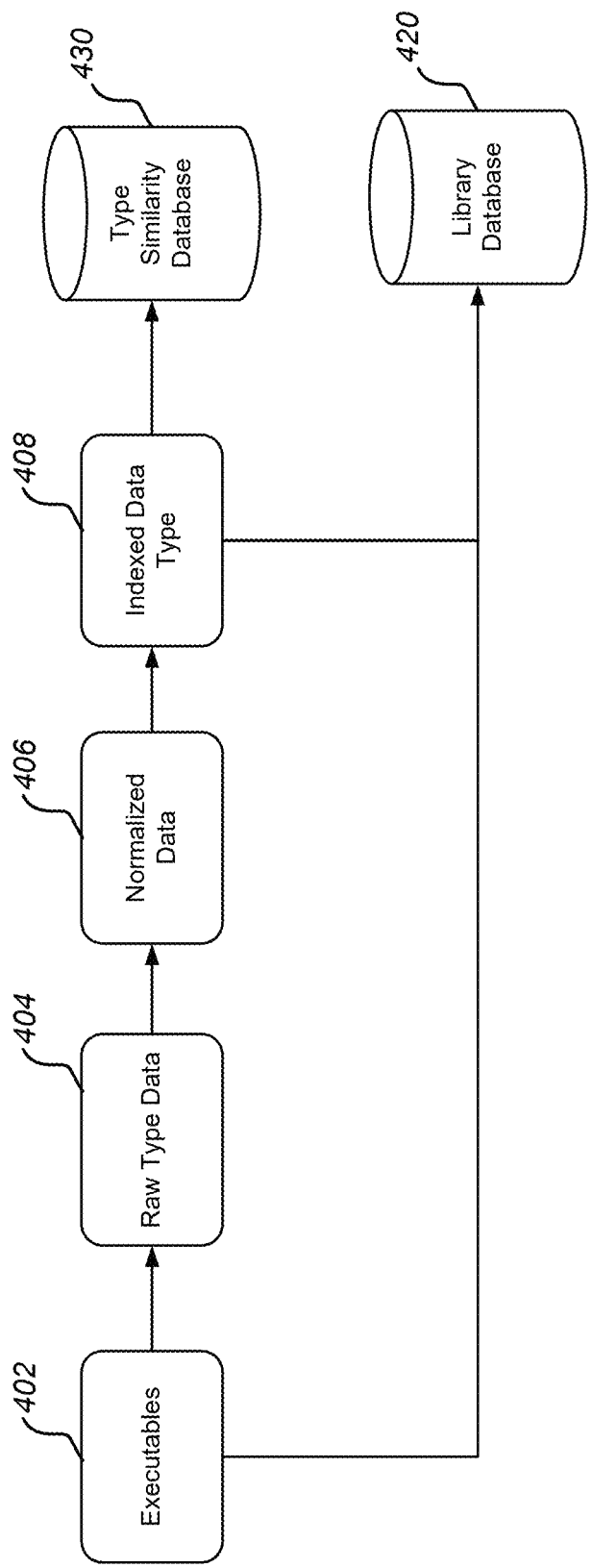
FIG. 4 is a conceptual diagram of generating an indexed data type corresponding to a program code of an application, according to one or more embodiments.

FIG. 4 is a conceptual diagram of generating an indexed data type corresponding to a program code (or one or more executables) of an application, according to one or more embodiments. In various embodiments, the process includes different or additional steps than those described in conjunction with FIG. 4. Further, in some embodiments, the steps of the process may be performed in different orders than the order described in conjunction with FIG. 4. The process described in conjunction with FIG. 4 may be carried out by the identification system 110 in various embodiments.

As shown in FIG. 4, the extraction module 202 may access one or more executables 402 of an application. The executables 402 may include a plurality of program codes. The extraction module 202 may extract the raw type data 404 (e.g., the raw type data 310 shown in FIG. 3) associated with the executables 402. The normalization module 204 may normalize the raw type data 404 to generate normalized type data 406 (e.g., the normalized type data 314 in FIG. 3) corresponding to the raw type data 404. The normalized type data 406 may include the data type information of the executables 402. In some embodiments, the normalization module 204 may normalize the raw type data into a flat string that describes at least class information and depth information of the raw type data 404. The index module 206 may index the normalized type data 406 to generate an indexed data type 408 corresponding to the normalized type data 406 and store the indexed data type 408 in the type similarity database 430. Each application's executables 402 may include a set of program codes, and the identification system 110 may generate a plurality of indexed data types 408 each corresponding to a program code included in the executable 402. The indexed data types 408 may be stored in the type similarity database 430.

Identifying Application Type Using Indexed Data Type

Figure 5:
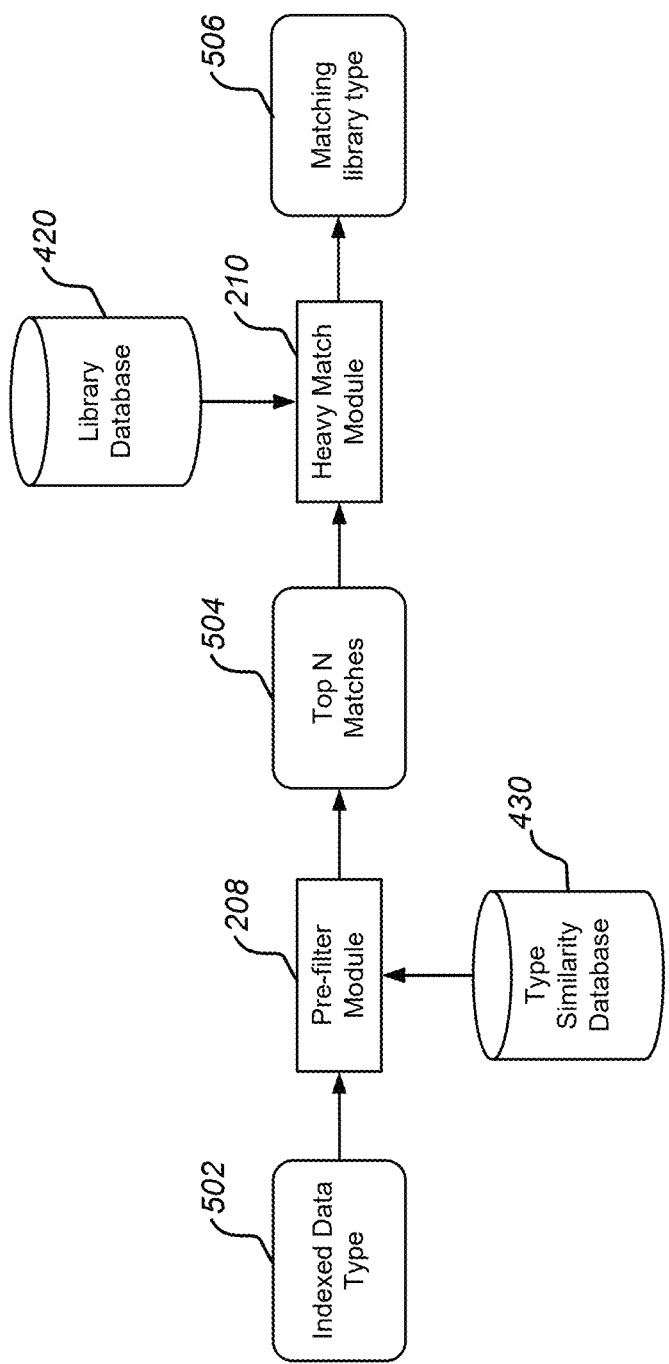
FIG. 5 is a conceptual diagram of determining an application type corresponding to a program code of a target application, according to one or more embodiments.

FIG. 5 is a conceptual diagram of determining an application type corresponding to a program code of a target application, according to one or more embodiments. In various embodiments, the process includes different or additional steps than those described in conjunction with FIG. 5. Further, in some embodiments, the steps of the process may be performed in different orders than the order described in conjunction with FIG. 5. The process described in conjunction with FIG. 5 may be carried out by the identification system 110 in various embodiments.

As shown in FIG. 5, the identification system 110 may receive a target indexed data type 502 that corresponds to a target program code of a target application. The identification system 110 may input the target indexed data type 502 into the pre-filter module 208. The pre-filter module 208 receives the target indexed data type 502 and accesses the type similarity database 430. The type similarity database 430 may include a plurality of indexed library data type, and each indexed library data type corresponds to normalized type data of a library type. The pre-filter module 208 may output one or more candidate indexed library data types based on the similarity between the target indexed data type and a candidate indexed library data type. In some embodiments, the one or more candidate library data types may include top N matches 504 of the indexed library data types. The pre-filter module 208 may determine the candidate library types that correspond to the candidate indexed library data types. The determined candidate library types may be input into the heavy match module 210. The heavy match module 210 may access the library database 420 to access the program code of the candidate library types. The heavy match module 210 may perform a heavy match between the program code of the target application and the program of each candidate library type to determine a matching library type 506 for the target program code of the target application. In some implementations, the heavy match module 210 determines the level of match between the target program code of the target application and the program code of the candidate library type. For example, the heavy match module 210 may determine what parts of the target application match known libraries, and a level of the corresponding match. In some embodiments, based on the determined library type, the identification system 110 may further determine the library and/or version number of the determined library type. In some embodiments, the identification system 110 may output a list of libraries and their version numbers, such as, software development kits (SDK)/framework included in the target application. The identification system 110 may perform a security analysis on the determined libraries. When detecting a risk associated with the determined libraries, the identification system 110 may transmit an instruction to perform a security action on the target application. For example, based on the determined libraries, the identification system 110 may determine that the target application is likely to be associated with a suspicious program that may infect a computing device when the suspicious program is loaded, opened, or executed. In some embodiments, the identification system 110 may input one or more determined libraries of a target application into a trained machine learning model. The machine learning model may be trained by using a training dataset that includes application types of applications with known security risks (e.g., malicious program, malware, etc.). The output of the machine learning model may be a score that indicates a likelihood of the target application being associated with a security risk. In some implementations, when the output score indicates that the likelihood meets a threshold risk, the identification system 110 may transmit an instruction to perform a security action on the target application. In some embodiments, the security action may include quarantining, deleting, preventing access to the target application and the like.

Figure 6:
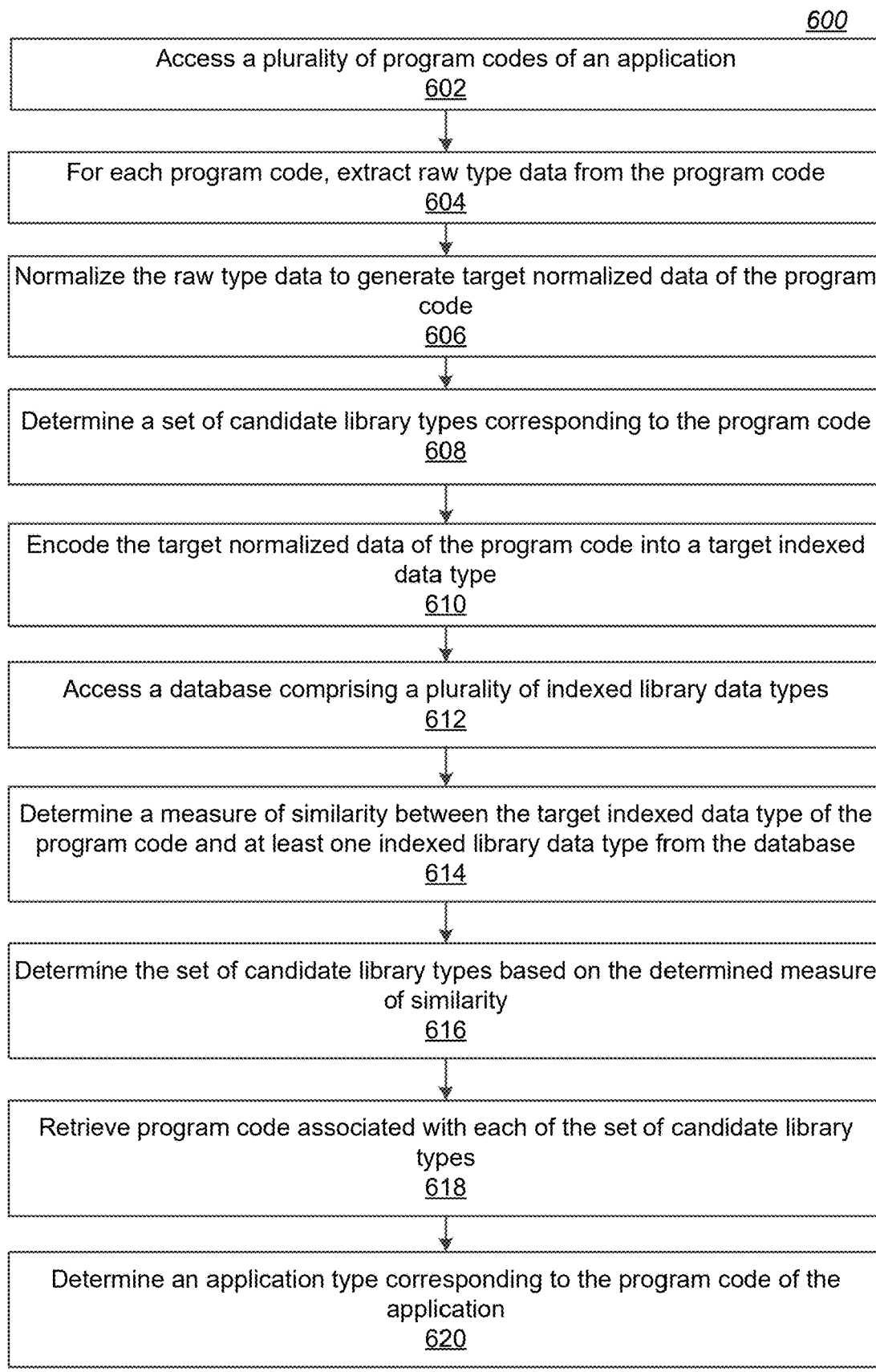
FIG. 6 illustrates one embodiment of a process for identifying an application type of an application based on a program code included in the application, according to one or more embodiments.

FIG. 6 illustrates one embodiment of a process 600 for identifying an application type of an application based on a program code included in the application, according to one or more embodiments. In various embodiments, the process includes different or additional steps than those described in conjunction with FIG. 6. Further, in some embodiments, the steps of the process may be performed in different orders than the order described in conjunction with FIG. 6. The process described in conjunction with FIG. 6 may be carried out by the identification system 110 in various embodiments.

As shown in FIG. 6, in some embodiments, the identification system 110 accesses 602 a plurality of program codes included in a binary code of an application. For at least one program code of the plurality of program codes, the identification system 110 may extract 604 raw type data from the program code and normalize 606 the raw type data to generate target normalized type data of the program code. The target normalized type data may include data type information of the program code. In some embodiments, the normalized type data of a program code in the binary code may include a flat string that describes at least class information and depth information of raw type data associated with the program code. In some implementations, the identification system 110 may deduplicate the target normalized type data to keep hierarchy and structure of the raw type data.

The identification system 110 may apply 608 models to the target normalized type data to determine a set of candidate library types corresponding to the program code. In some embodiments, when applying the model to the target normalized type data, the identification system 110 may encode 610 the target normalized type data of the program code as a target indexed data type. The identification system 110 may access 612 a database which includes a plurality of indexed library data types. Each of the indexed library data types may correspond to normalized type data of a library type (e.g., a known application type). In some embodiments, the identification system 110 may encode the normalized type data of each library type as an indexed library data type in a latent space, index the library types based on distances between the plurality of indexed library data types in the latent space, and store the library types associated with the corresponding indexed library data types in the database.

In some embodiments, the identification system 110 may determine 614 a measure of similarity between the target indexed data type of the program code and at least one indexed library data type from the database. Based on the determined measure of similarity, determines 616 the set of candidate library types having the corresponding indexed library data types. In some embodiments, the identification system 110 may determine the measure of similarity by comparing the target indexed data type of the program code and each of the one or more indexed library data types in the latent space. In some implementations, the identification system 110 may select an indexed library data type that has at least a threshold measure of similarity as a candidate indexed library data type and select the library type corresponding to the candidate indexed library data type as one of the set of candidate library types. In some implementations, the identification system 110 may rank the one or more indexed library data types based on the determined measure of similarity and select candidate indexed library data types based on the ranking. The identification system 110 selects the library types corresponding to the selected candidate indexed library data types as the candidate library types.

The identification system 110 accesses 618 the program code associated with each of the set of candidate library types and determines 620 an application type corresponding to the application type of the target application by comparing the program code of the target application with the program code of each of the set of the candidate library types. In this way, the identification system 110 may the level of match between a target application and a known application without accessing the source code of the target application. In some embodiments, the identification system 110 may determine a library type for each program code included in the target application. For instance, the identification system 110 may determine what parts of the target application match known libraries, and a level of the corresponding match. In some embodiments, the identification system 110 may output a list of libraries and their version numbers, such as, SDK/framework included in the target application. In some embodiments, the identification system 110 may perform a security analysis on at least one of the determined library types. When detecting a risk associated with a determined library type, the identification system 110 may transmit an instruction to perform a security action on the application.

Figure 7:
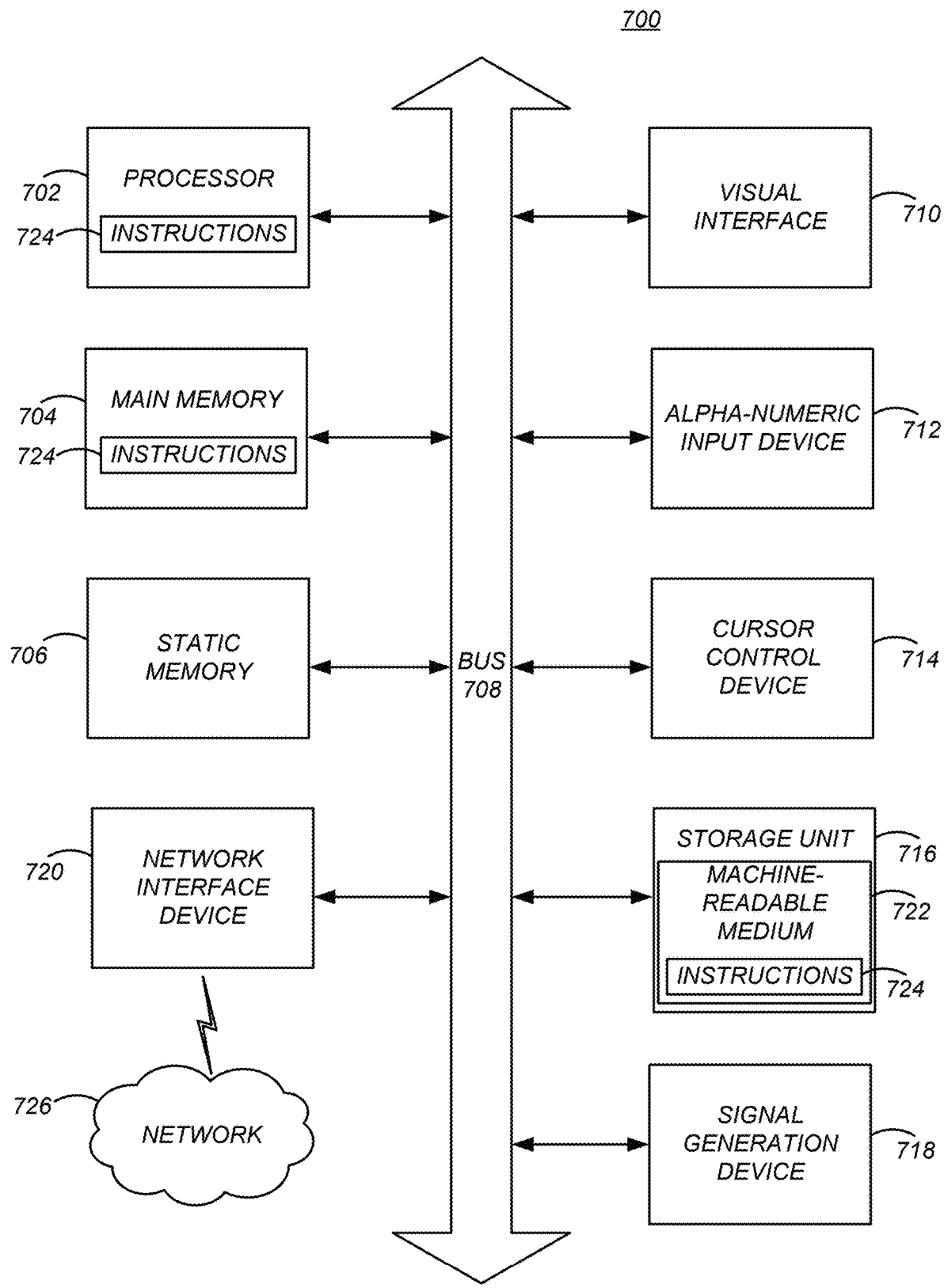
FIG. 7 is a block diagram illustrating components of an example machine able to read instructions from a machine-readable medium and execute them in a processor (or controller), according to one or more embodiments.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may consist of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alpha-numeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for identifying the application type of an application, parts of the application that match known libraries, and a level of match between the application and a known application, based on a binary code of the application through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   accessing a plurality of program codes of a target application;
   for at least one program code of the plurality of program codes,
      extracting raw type data from the program code;
      normalizing the raw type data to generate target normalized type data of the program code, the target normalized type data comprising data type information of the program code;
      determining a set of candidate library types corresponding to the program code, the determining comprising:
         indexing the target normalized type data of the program code as a target indexed data type;
         accessing a database comprising a plurality of indexed library data types each corresponding to a data type of a library type;
         determining a measure of similarity between the target indexed data type of the program code and at least one indexed library data type from the database; and
         determining, based on the determined measure of similarity, the set of candidate library types having the corresponding indexed library data type;
      accessing a program code associated with each of the set of candidate library types; and
      determining a library type corresponding to the program code of the target application based on a comparison between the program code of the target application and the program code of each of the set of the candidate library types.

2. The method of claim 1, wherein determining, based on the determined measure of similarity, the set of candidate library types comprises:
   determining the set of candidate library types based on a result of a comparison between the target indexed data type of the program code and each of the at least one indexed library data type.

3. The method of claim 1, wherein determining, based on the determined measure of similarity, the set of candidate library types comprises:
   selecting a library type corresponding to an indexed library data type that has at least a threshold measure of similarity as one of the set of candidate library types.

4. The method of claim 1, wherein determining, based on the determined measure of similarity, the set of candidate library types comprises:
   ranking the at least one indexed library data type based on the determined measure of similarity; and
   selecting the set of candidate library types of the at least one indexed library data type based on the ranking of corresponding indexed library data types.

5. The method of claim 1, wherein normalizing the raw type data to generate target normalized type data of the program code comprises generating a flat string that describes at least class information and depth information of the raw type data.

6. The method of claim 1, wherein accessing the database comprises:
   encoding the target normalized type data of each library type as an indexed library data type in a latent space; and
   storing library types associated with corresponding indexed library data types in the database.

7. The method of claim 1, wherein normalizing the raw type data to generate target normalized type data of the program code comprises: deduplicating the target normalized type data to keep hierarchy and structure of the raw type data.

8. The method of claim 1, further comprising:
   detecting a risk associated with a determined application type of the application; and
   transmitting an instruction to perform a security action on the application.

9. A non-transitory computer readable storage medium configured to store instructions, the instructions when executed by one or more processors causing the one or more processors to perform operations comprising:
   accessing a plurality of program codes of a target application;
   for at least one program code of the plurality of program codes, extracting raw type data from the program code;
      normalizing the raw type data to generate target normalized type data of the program code, the target normalized type data comprising data type information of the program code;
      determining a set of candidate library types corresponding to the program code, the determining comprising:
         indexing the target normalized type data of the program code as a target indexed data type;
         accessing a database comprising a plurality of indexed library data types each corresponding to a data type of a library type;
         determining a measure of similarity between the target indexed data type of the program code and at least one indexed library data type from the database; and
         determining, based on the determined measure of similarity, the set of candidate library types having the corresponding indexed library data type;
      accessing a program code associated with each of the set of candidate library types; and
      determining a library type corresponding to the program code of the target application based on a comparison between the program code of the target application and the program code of each of the set of the candidate library types.

10. The non-transitory computer readable storage medium of claim 9, wherein determining, based on the determined measure of similarity, the set of candidate library types comprises:
  determining the set of candidate library types based on a result of a comparison between the target indexed data type of the program code and each of the at least one indexed library data type.

11. The non-transitory computer readable storage medium of claim 9, wherein determining, based on the determined measure of similarity, the set of candidate library types comprises:
  selecting a library type corresponding to an indexed library data type that has at least a threshold measure of similarity as one of the set of candidate library types.

12. The non-transitory computer readable storage medium of claim 9, wherein determining, based on the determined measure of similarity, the set of candidate library types comprises:
  ranking the at least one indexed library data type based on the determined measure of similarity; and
  selecting the set of candidate library types of the at least one indexed library data type based on the ranking of corresponding indexed library data types.

13. The non-transitory computer readable storage medium of claim 9, wherein normalizing the raw type data to generate target normalized type data of the program code comprises generating a flat string that describes at least class information and depth information of the raw type data.

14. The non-transitory computer readable storage medium of claim 9, wherein accessing the database comprises:
  encoding the target normalized type data of each library type as an indexed library data type in a latent space; and
  storing library types associated with corresponding indexed library data types in the database.

15. The non-transitory computer readable storage medium of claim 9, wherein normalizing the raw type data to generate target normalized type data of the program code comprises:
  deduplicating the target normalized type data to keep hierarchy and structure of the raw type data.

16. The non-transitory computer readable storage medium of claim 9, wherein the operations further comprise:
  detecting a risk associated with a determined application type of the application; and
  transmitting an instruction to perform a security action on the application.

17. A system comprising memory with instructions encoded thereon that, when executed by one or more processors, cause the one or more processors to perform operations comprising:
  accessing a plurality of program codes of a target application;
  for at least one program code of the plurality of program codes,
    extracting raw type data from the program code;
    normalizing the raw type data to generate target normalized type data of the program code, the target normalized type data comprising data type information of the program code;
    determining a set of candidate library types corresponding to the program code, the determining comprising:
      indexing the target normalized type data of the program code as a target indexed data type;
      accessing a database comprising a plurality of indexed library data types each corresponding to a data type of a library type;
      determining a measure of similarity between the target indexed data type of the program code and at least one indexed library data type from the database; and
      determining, based on the determined measure of similarity, the set of candidate library types having the corresponding indexed library data type;
    accessing a program code associated with each of the set of candidate library types; and
    determining a library type corresponding to the program code of the target application based on a comparison between the program code of the target application and the program code of each of the set of the candidate library types.

18. The system of claim 17, wherein normalizing the raw type data to generate target normalized type data of the program code comprises generating a flat string that describes at least class information and depth information of the raw type data.

19. The system of claim 17, wherein normalizing the raw type data to generate target normalized type data of the program code comprises: deduplicating the target normalized type data to keep hierarchy and structure of the raw type data.

20. The system of claim 17, wherein the operations further comprise:
  detecting a risk associated with a determined application type of the application; and
  transmitting an instruction to perform a security action on the application.

* * * * *